United States Patent [19]

Nakamune et al.

[11] Patent Number: 4,909,186

[45] Date of Patent: Mar. 20, 1990

[54] FISH CAGE FOR CULTIVATING FISH

[75] Inventors: Hideo Nakamune; Haruki Hirose, both of Tokyo, Japan

[73] Assignee: Nippon Kokan Kabushiki Kaisha, Tokyo, Japan

[21] Appl. No.: 178,626

[22] Filed: Apr. 7, 1988

[30] Foreign Application Priority Data

Apr. 7, 1987 [JP] Japan .............................. 62-51579[U]
Apr. 7, 1987 [JP] Japan .............................. 62-51580[U]

[51] Int. Cl.⁴ .............................................. A01K 63/00
[52] U.S. Cl. ....................................................... 119/3
[58] Field of Search ..................... 119/3; 114/126, 256, 114/257

[56] References Cited

U.S. PATENT DOCUMENTS

| | | | |
|---|---|---|---|
| 3,643,617 | 2/1972 | Holden | 114/126 |
| 3,653,358 | 4/1972 | Fremont | 119/3 |
| 4,003,338 | 1/1977 | Neff et al. | 119/3 |
| 4,257,350 | 3/1981 | Streichenberger | 119/3 |
| 4,610,219 | 9/1986 | Marimura | 119/3 |

FOREIGN PATENT DOCUMENTS 839455 6/1981 U.S.S.R. .................................. 119/3

Primary Examiner—Robert P. Swiatek
Attorney, Agent, or Firm—Fleit, Jacobson, Cohn, Price, Holman & Stern

[57] ABSTRACT

A fish cage for cultivating fish comprises a hull shaped vessel composed of outer side platings, inner bottom platings, screen bulkheads and a deck. A device for floating a hull shaped vessel on the water is provided, and openings are formed in the outer side platings and inner bottom platings and covered with nets so as to let sea water flow in and out of the hull shaped vessel. The device for floating the vessel on the water is formed by tanks arranged on the upper side of the outer side platings to hold air. Openings are provided in the bulkheads and covered with nets affixed to the screen bulkheads for letting sea water flow in and out. Openings are also provided in the outer side platings on the bow and on the stern of the vessel for letting sea water flow in and out.

13 Claims, 6 Drawing Sheets

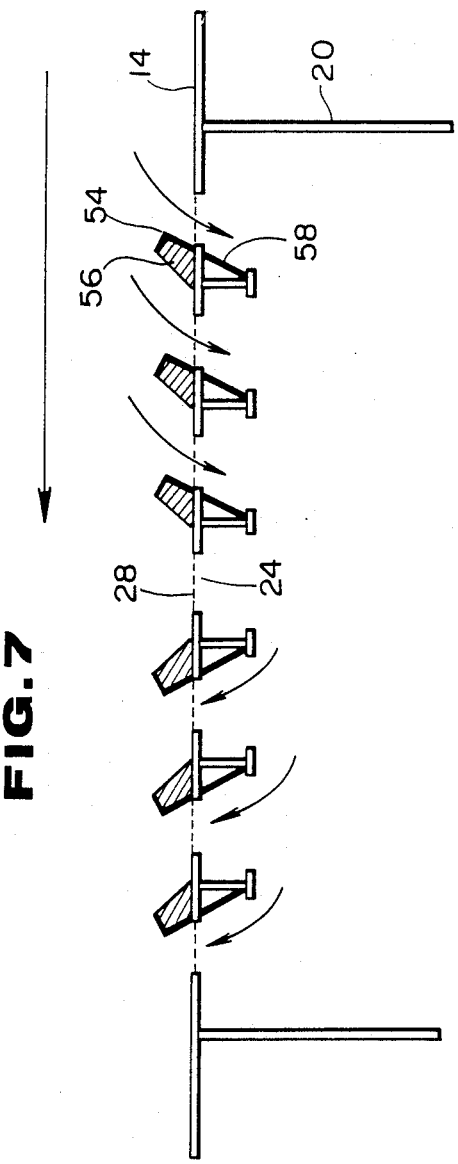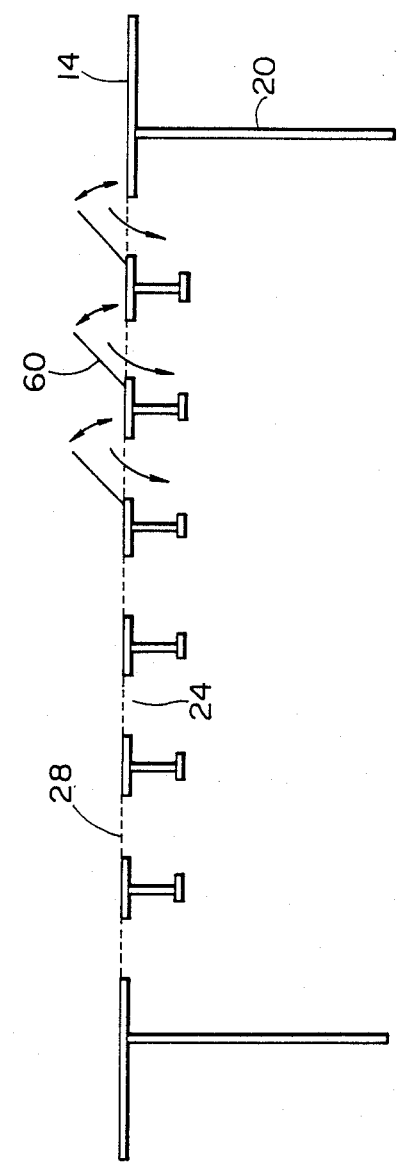

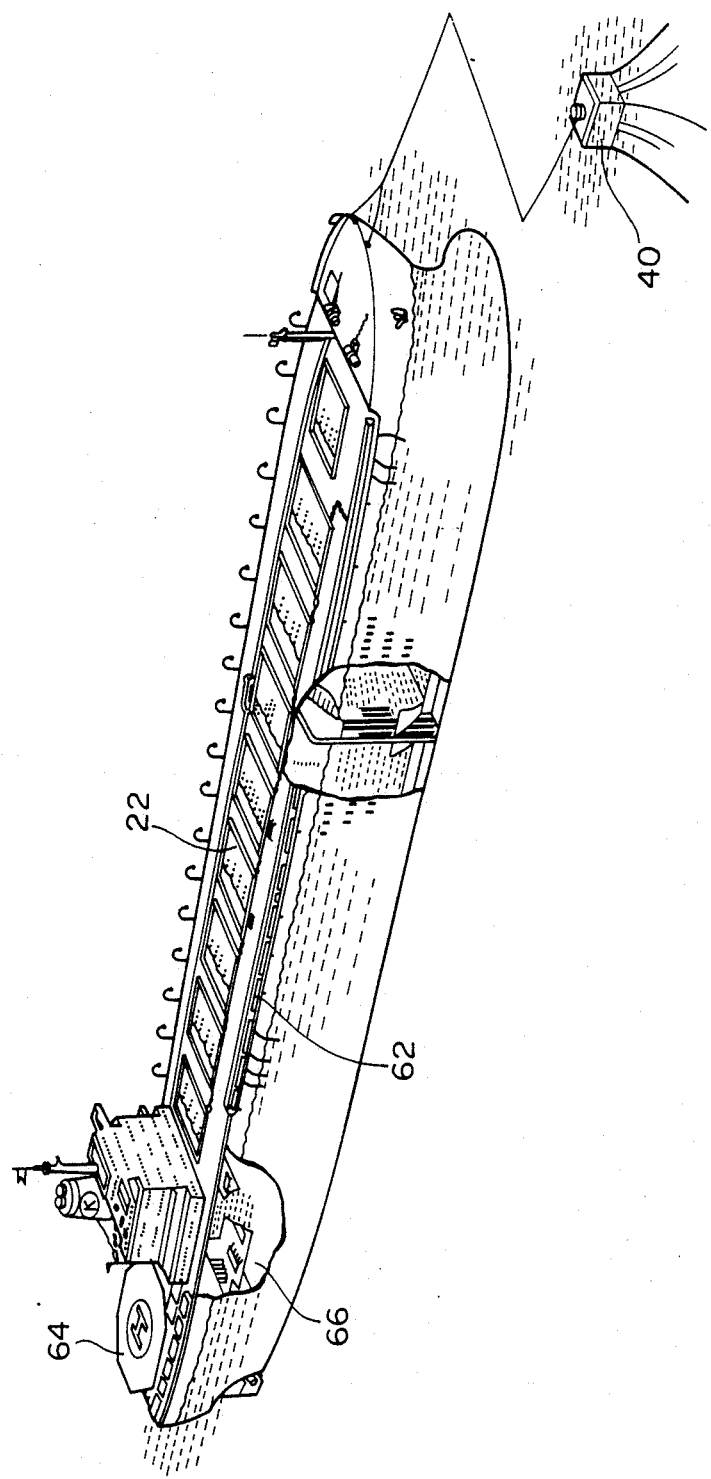

FISH CAGE FOR CULTIVATING FISH

BACKGROUND OF THE INVENTION

1. Field of the Invention

The present invention relates to facilities for cultivating fish.

2. Description of the Prior Art

Conventionally fish reserves for cultivating fish have been formed as follows.

(a) A predetermined space in the water of a bay is enclosed with nets, and the space thus made enclosed is used as a fish reserve for cultivating such fish as yellowtail, sea bream, flatfish and the like.

(b) A box with a certain volume is made of wood or steel sheets, and the box filled up with sea-water is used as a fish reserve for cultivating fish.

(c) A wooden box is partitioned with nets and is used as a fish reserve.

It has conventionally been necessary to arrange fish reserves such as those mentioned above in the water of a bay or by the sea shore. However, due to an insufficient circulation of sea water in bays or in waters by the sea shores, contamination of sea water has often occurred as a result of longterm drifting or accumulation of fish leftovers and droppings on the bottom of the reserve. Sea water contamination is also easily accelerated by an inflow of sewage into the sea from factories located along a nearby coast. Because of this, the mortality rate of cultured fish has been high and the growth of cultured fish has been less than normal. Moreover, the fish which has been cultivated is often contaminated by harmful substances contained in sewage discharged from such factories.

SUMMARY OF THE INVENTION

The object of the present invention is to provide sufficient fish cage, by means of which a sea water circulation is ensured and uncontaminated sea water can be obtained. In order to attain the abovementioned object, in accordance with the present invention, a fish cage for cultivating fish comprises a hull shaped vessel composed of outer side platings, an inner bottom plating, screen bulkheads and a deck; a means for floating the hull-shaped vessel on the water; and openings formed in the outer side platings and the inner bottom plating and covered with nets so as to let sea water flow in and out of the hull shaped vessel.

This object and others and advantages of the present invention, will become apparent from the detailed description to follow, when considered in conjunction with the appended drawings.

BRIEF DESCRIPTION OF THE DRAWINGS

FIG. 7 is a sectional plan view illustrating a partial enlarged portion of outer side openings according to the present invention;

FIG. 8 is an enlarged sectional plan view illustrating a portion of another type of outer side openings according to the present invention; and FIG. 9 is a perspective view illustrating a third preferred embodiment, designated Preferred Embodiment-3 in a combination of a tanker type ship and a fish cage.

DESCRIPTION OF THE PREFERRED EMBODIMENTS

The preferred embodiments will now be explained with reference to the drawings.

Preferred Embodiment-1

Figure 1:
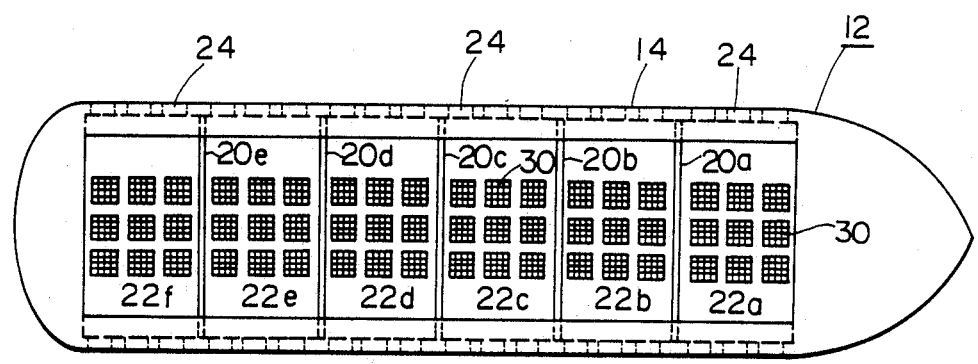
FIG. 1 is a plan view illustrating a first preferred embodiment, designated Preferred Embodiment-1, of the present invention.
Figure 2:
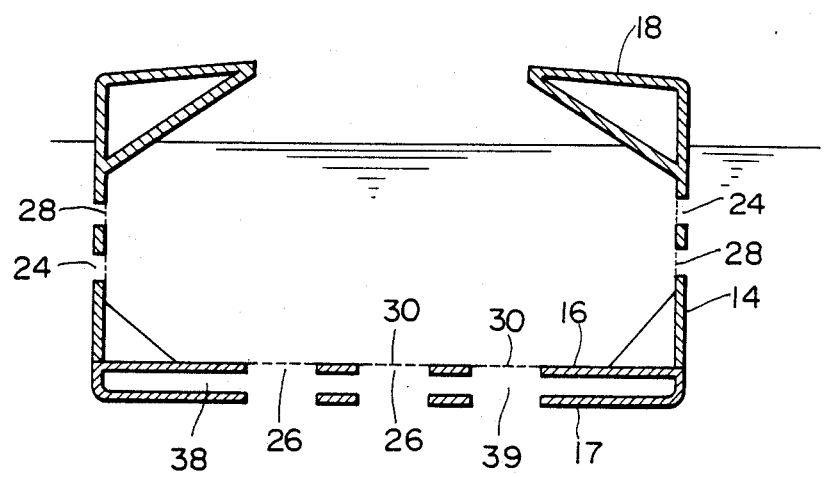
FIG. 2 is a cross-sectional view of FIG. 1, illustrating Preferred Embodiment 1 of the present invention.
Figure 3:
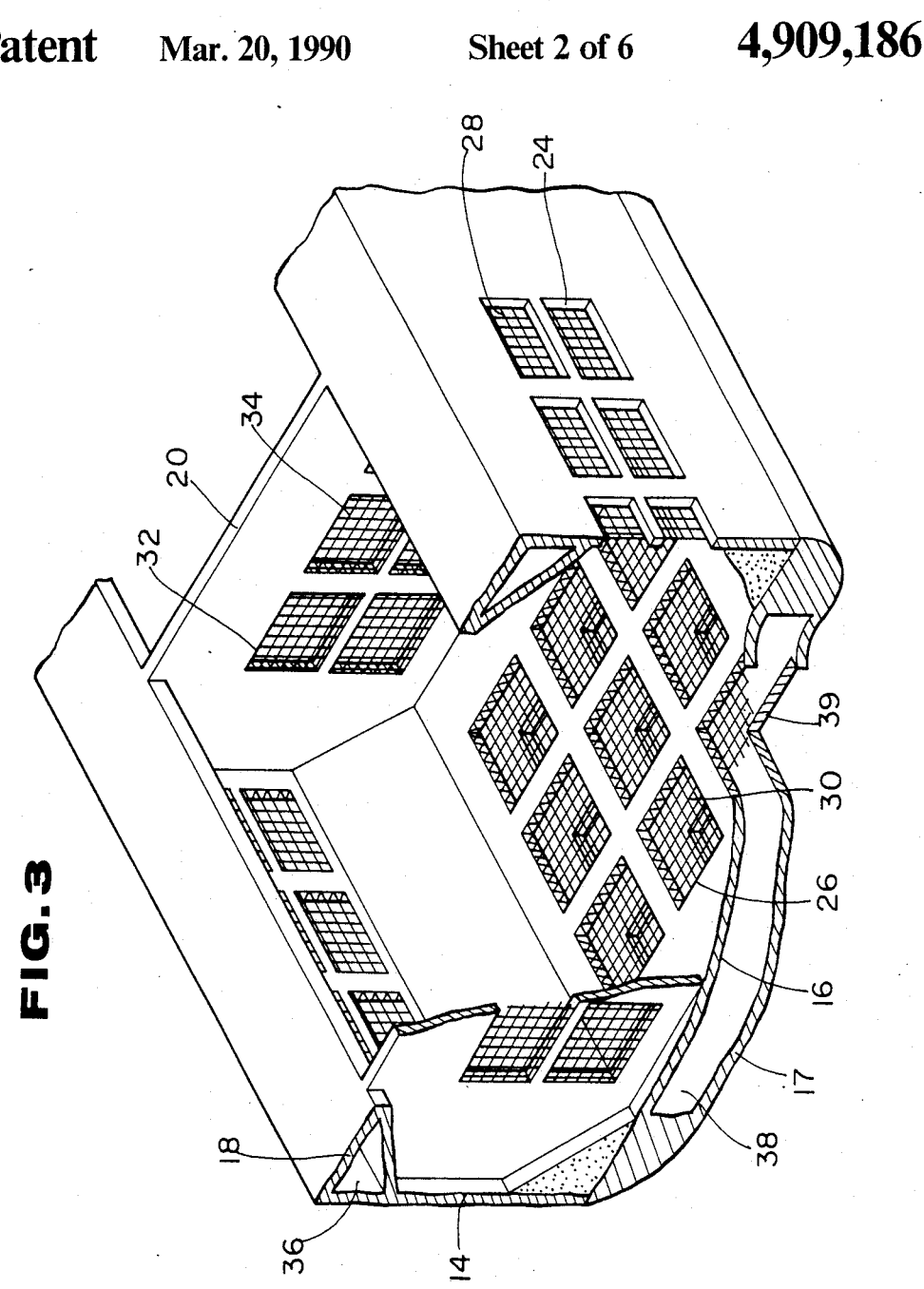
FIG. 3 is a partial enlarged and broken away cross sectional view illustrating Preferred Embodiment-1 of the present invention in perspective.

As noted above, FIG. 1 is a plan view illustrating Preferred Embodiment-1 of the present invention, FIG. 2 is a sectional view of FIG. 1, illustrating Preferred Embodiment-1 of the present invention, FIG. 3 is a partial enlarged and broken away view illustrating a portion of Preferred Embodiment-1 of the present invention in perspective. Hull-shaped vessel 12 is composed of outer side platings 14, inner bottom plating 16 and deck 18. Vessel 12 is partitioned by screen bulkheads 20a, 20b, 20c, 20d and 20e vertically and in the longitudinal direction of the hull-shaped vessel so as to form a plurality of chambers 22a, 22b, 22c, 22d, d, 22e and 22f. Side openings 24 are formed in outer side platings 14 of the vessel 12, and bottom openings 26 in inner bottom plating 16. Side openings 24 are covered with nets 28, and bottom openings 26 with net 30. Sea water flows freely in and out through side openings 24 and bottom openings 26 and circulates sufficiently through the plurality of chambers 22a, 22f. Also, openings 32 are formed in screen bulkheads 20a–20e and are covered with net 34 affixed thereto, through which sea water flows from and to each of the chambers toward the stern side of vessel 12.

Top side tanks 36, containing air, are provided on the upper part produced by outer side platings 14. Buoyancy of the air in the top side tanks 36 floats the hull shaped vessel 12 on the water. Top side tanks 36 can be omitted if wood, having buoyancy so that it floats on water, is used as the material of vessel 12. Bottom chamber 38 is formed between inner bottom plating 16 and outer bottom plating 17 of vessel 12. Bottom openings 39 are formed in outer bottom plating 17. However, nets are not laid on bottom openings 39, through which fish in the sea can go in and out freely. Bottom chamber 38 therefore becomes a fish lair. It is desirable that chamber 38 become a fish lair because the leftovers left by cultivated fish go down into the bottom chamber. It is also desirable to select mesh sizes of nets 28, 30 and 34 appropriately in compliance with the sizes of fish in chambers 22a–22f. For example, it is desirable that the net meshes become larger as fish move on from chamber 22a to 22f. Therefore the mesh size of the nets in the openings of the outer side platings, inner bottom plating and screen bulkhead 20a, which face chamber 22a, is made smaller. The mesh size of the nets in the openings of the outer side platings, inner bottom plating and screen bulkhead 20b, which face chamber 22b, is made a little bit larger than the mesh sizes of the nets in the openings of chamber 22a. The mesh sizes of the nets can be selected appropriately in accordance with the sizes of fish, which have been moved successively from chamber 22b, to chamber 22e as the fish grow after the young of fish have been put into chamber 22a. As a result, the problem of an insufficient circulation of sea water because the net meshes are small in comparison with the sizes of fish does not occur.

An example of a fish lair formed by bottom chamber 38 on the bottom of vessel 12 is shown in Preferred Embodiment-1. The fish lair, however, is not necessarily confined to the abovementioned construction. The bottom a the vessel can be of single type structure, a triple type structure, etc.

Figure 4:
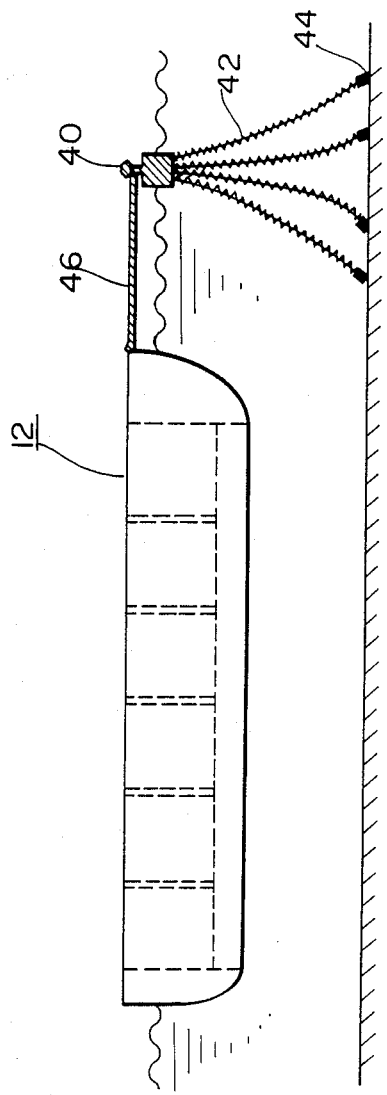
FIG. 4 is an plan view illustrating a way of mooring the fish cage of the present invention.

Next, a way of mooring hull-shaped vessel 12 will be explained with specific reference to FIG. 4. Buoy 40, floating on the water, is connected to anchors 44 by means of a plurality of chains 42, and stays in a predetermined place on the water. Hull-shaped vessel 12 is moored to buoy 40 by means of rope 46, located at a predetermined place on the water. That is to say, a tugboat is loaded with buoy 40 and a fish cage is towed by the tugboat to a predetermined place, where buoy 40 is placed. Hull shaped vessel 12 is moored at one point by means of rope 46. When moored at one point, the fish cage can always be maintained in a stable state even if the sea is rough and waves are high, or even if the sea current is strong, because the fish cage is always turned so that its bow is in oriented a direction parallel to the direction of waves and the sea current. If the fish cage is Preferred Embodiment-1 is used, the fish cage is freely movable on the water. Therefore, if the fish cage is moved to the ocean, where there is a sea current with a sufficient circulation of sea water, cultured fish can constantly be supplied with fresh and uncontaminated sea water. Moreover, the mortality ratio of cultured fish can be maintained at a low level, and well-grown and uncontaminated fish can be cultivated.

Peferred Embodiment-2

Figure 5:
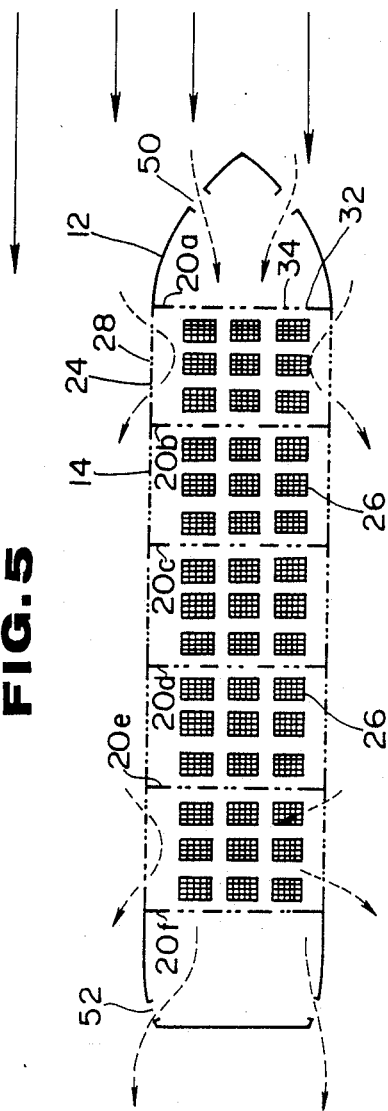
FIG. 5 is a sectional plan view illustrating a second preferred embodiment, designated Preferred Embodiment-2, of the present invention.
Figure 6:
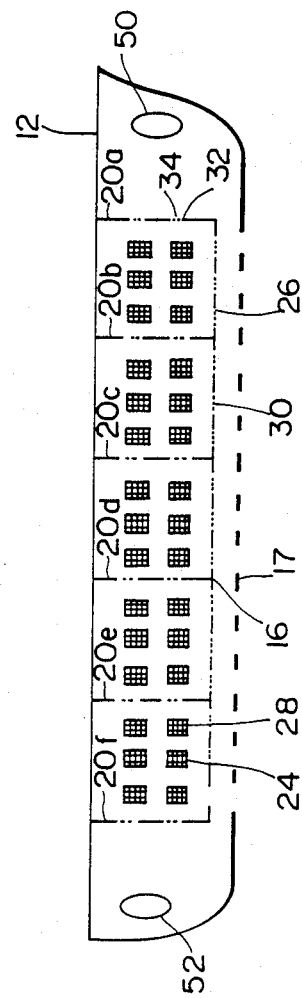
FIG. 6 is a sectional side elevation view illustrating Preferred Embodiment-2 of the present invention.

As also noted above, FIG. 5 is a sectional plan view illustrating Preferred Embodiment-2 of the present invention, and FIG. 6 is a sectional side elevation view of FIG. 5 illustrating Preferred Embodiment-2 of the present invention. Hull shaped vessel 12 is partitioned by screen bulkheads 20a, 20b, 20c, 20d, 20e and 20f and is composed of chambers in a manner similar to Preferred Embodiment-1. Furthermore, side openings 24, bottom openings 26 and screen bulkhead openings 32 are formed in outer side platings 14, inner bottom plating 16 and screen bulkheads 20a, 20f respectively, as was the case in Preferred Embodiment-1. Besides the abovementioned openings, bow openings 50 and stern openings 52 are formed.

In a hull-shaped vessel 12 composed as mentioned above, sea water flows into vessel 12 through bow opening 50, and then into first chamber 22a through the nets affixed to openings 32 formed in screen bulkhead 20a. Sea water which has flowed into first chamber 22a flows into second chamber 22b through the net affixed to openings 32 formed in bulkhead 20b. In this way, sea water moves towards the stern in hull shaped vessel 12 and, finally, flows out of the hull shaped vessel through stern openings 52. A part of the sea water which has flowed into hull shaped vessel 12 also flows out of the vessel on the way to the stern from side openings 24 and bottom openings 26. In the meantime, sea water also flows in from side openings 24.

FIG. 7 is an enlarged sectional plan view illustrating a pair of side openings 24. In FIG. 7, reference number 14 denotes outer side platings, number 20 denotes screen bulkheads, number 24 denotes side openings, number 28 denotes a net, number 54 denotes fins, number 56 denotes a fin reinforcing material and number 58 denotes a water flow control plate. Fins 54 and fin reinforcing material 56 are set at an acute angle relative to the sea current direction at the side openings 24 disposed on the bow side of vessel 12. By contrast fins 54 and material 56 are set at an obtuse angle relative to the sea current at the side openings 24 disposed on the stern side of the vessel 12. Through the provision of side openings 24 composed in such a manner, the sea water, flowing in the direction shown by arrow symbols, flows in chamber 22 through side openings 24, being led or guided fins 54. Flow of sea water into chamber 22 is controlled by water flow control plates 58 and goes on in a certain direction. On the other hand, sea water is allowed to flow out of vessel 12 easily by means of fins 54 and sea water control plates 58 located at side openings disposed on the stern side of the vessel.

The structure of side openings 24 is not necessarily limited to the structure shown in FIG. 7 and can have a structure as shown in FIG. 8. As shown in FIG. 8, a cover is set by a hinge so that it can turn in the direction as indicated with arrow symols. Furthermore, each cover 60 can be fixed at an appropriate angle. Inflow of sea water can be controlled by varying the angles of cover 60. When the sea is rough in stormy weather, influence of the bad weather can be minimized by fully closing cover 60. When a fish cage in Preferred Embodiment-2 is used, sea water can circulate fully inside the vessel, because sea water flows through the vessel, with aid of the fins, even if a sea current is parallel to the side openings.

Preferred Embodiment-3

FIG. 9 is a perspective view illustrating Preferred Embodiment-3, i.e., a combination of a tanker type ship with a fish cage provided with chambers having side openings, bottom openings and screen bulkhead openings. Hull shaped vessel 12 is provided with independent chambers 22 for cultivating fish, fishing pool 62, heliport 64, resting place 66 and buoy 40. In the case of this Preferred Embodiment, the fish cage can move for itself on the sea and an ordinary ship can be used as a fish cage. Accordingly, Preferred Embodiment-3 is advantageous in cost. Such a fish cage can be used as complex leisure facilities.

What is claimed is:
1. A fish cage for cultivating fish comprising:
   a hull shaped vessel having outer side platings, inner bottom platings, screen bulkheads and a deck;
   a means for floating the hull shaped vessel on the water;
   outer side openings formed in said outer side platings and inner bottom openings in said inner bottom platings, said outer side openings and said inner bottom openings being covered with nets so as to let sea water flow in and out of the hull shaped vessel;
   an outer bottom plating under the inner bottom platings; and
   a fish lair formed by a chamber between the inner bottom platings and the outer bottom plating.

2. The fish cage according to claim 1, wherein said means for floating the vessel on the water includes tanks arranged on an upper side of said outer side platings to hold air.

3. The fish cage according to claim 1, wherein said screen bulkheads include screen bulkheads having openings covered with nets which let sea water flow in and out.

4. The fish cage according to claim 1, wherein said outer side openings formed in said outer side platings include bow openings formed on a bow and stern openings on a stern, sea water flowing into the hull shaped vessel through said bow openings and out of the hull shaped vessel through said stern openings.

5. The fish cage according to claim 1, wherein said outer side openings have fins oriented at a predetermined angle relative to a sea current, said fins guiding sea water flow into and out of said hull shaped vessel.

6. The fish cage according to claim 1, wherein said outer side openings have fins at angles which may vary relative to a sea current.

7. A fish cage for cultivating fish comprising:
a hull shaped vessel having outer side platings, inner bottom platings, screen bulkheads and a deck;
a means for floating the hull shaped vessel on the water;
outer side openings formed in said outer side platings, inner bottom openings in said inner bottom platings and bulkhead openings in said screen bulkheads, said outer side openings, inner bottom openings and said bulkhead openings being covered with nets so as to let sea water flow in and out of the hull shaped vessel; and
fins oriented at a predetermined angle relative to a sea current placed at said outer side openings, said fins guiding sea water flow into and out of the hull shaped vessel.

8. The fish cage according to claim 7, wherein said outer side openings include bow openings formed on a bow and stern openings formed on a stern, sea water flowing into the hull shaped vessel through said bow openings and out of the hull shaped vessel through said stern openings.

9. The fish cage according to claim 7, further including water flow control plates placed in said outer side openings, said water flow control plates arranging flow of sea water which is guided by said fins to flow into the hull shaped vessel.

10. The fish cage according to claim 7, further including chambers for fish lairs formed between outer bottom platings and said inner bottom platings, said outer bottom platings having outer bottom openings placed under said inner bottom platings.

11. A fish cage for cultivating fish comprising:
a hull shaped vessel having outer side platings, inner bottom platings, screen bulkheads and a deck;
a means for floating the hull shaped vessel on water;
outer side openings formed in said outer side platings, inner bottom openings in said inner bottom platings and bulkhead openings in said screen bulkheads, said outer openings, said inner bottom openings and said bulkhead openings being covered with nets so as to let sea water flow in and out of the hull shaped vessel; and
covers with a variable angle relative to a sea current placed at said outer side openings, said covers controlling inflow of sea water through said outer side openings.

12. The fish cage according to claim 11, further including chambers for fish lairs formed between outer bottom platings and said inner bottom platings, said outer bottom platings having outer bottom openings placed under said inner bottom platings.

13. The fish cage according to claim 11, wherein said outer side openings formed in said outer side platings include bow openings formed on a bow and stern openings on a stern, the bow openings allowing sea water to flow into the hull shaped vessel and the stern openings allowing the sea water to flow out from the hull shaped vessel.

* * * * *

UNITED STATES PATENT AND TRADEMARK OFFICE
CERTIFICATE OF CORRECTION

PATENT NO. : 4,909,186             Page 1 of 3

DATED : March 20, 1990

INVENTOR(S) : Hideo NAKAMUNE et al.

It is certified that error appears in the above-identified patent and that said Letters Patent is hereby corrected as shown below:

Column 1, line 12, "made" should be deleted;

line 17, after "box" --is-- should be inserted, and "is" should read --and--;

line 24, "the" should be deleted;

line 39, "sufficient" should read --a-- and "a" should read --sufficient--.

Column 2, line 22, after "invention," --and-- should be inserted;

line 28, after "20e", --set-- should be inserted;

line 30, "d," should be deleted;

line 43, "produced by" should be changed to --of--;

line 44, "of" should be changed to --produced by--;

UNITED STATES PATENT AND TRADEMARK OFFICE
CERTIFICATE OF CORRECTION

PATENT NO. : 4,909,186

DATED : March 20, 1990

INVENTOR(S) : Hideo NAKAMUNE et al.

It is certified that error appears in the above-identified patent and that said Letters Patent is hereby corrected as shown below:

line 63, "smaller" should be changed to --small--.

Column 3, line 11, "a" should be changed to --of-- and "of" to --a--;

line 27, "in" should be deleted and after "oriented", --in-- should be inserted;

line 29, "is" should be changed to --of--;

line 66, "from" should be changed to --through--.

Column 4, line 15, after "guided", --by-- should be inserted;

line 24, after "cover", --60-- should be inserted;

line 25, "symols" should be changed to --symbols--;

UNITED STATES PATENT AND TRADEMARK OFFICE
CERTIFICATE OF CORRECTION

PATENT NO. : 4,909,186

DATED : March 20, 1990

INVENTOR(S) : Hideo NAKAMUNE et al

It is certified that error appears in the above-identified patent and that said Letters Patent is hereby corrected as shown below:

line 32, "through" should be changed to --in--;

line 33, "with" should be changed to --through the--.

Signed and Sealed this

Third Day of March, 1992

Attest:

HARRY F. MANBECK, JR.

*Attesting Officer*     *Commissioner of Patents and Trademarks*